July 17, 1934.  W. BLACKMORE  1,966,606

ROLLER BEARING JOURNAL BOX

Filed Feb. 2, 1929  4 Sheets-Sheet 2

Inventor
William Blackmore
By his Attorney
Clarence A. Kerr

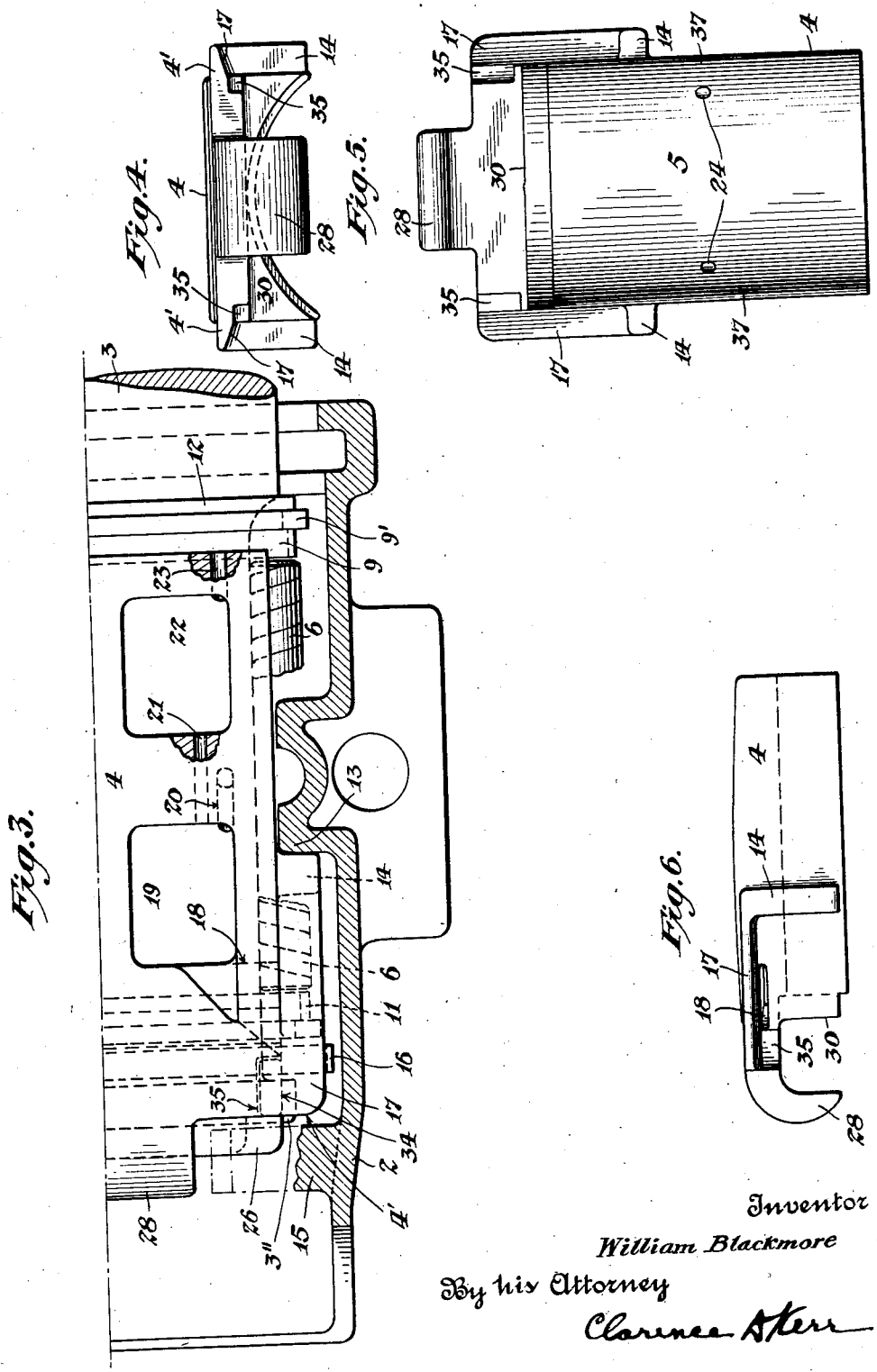

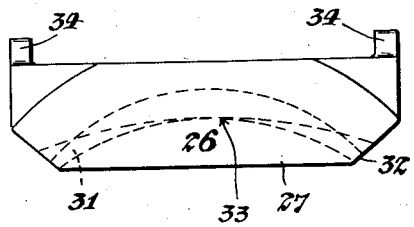
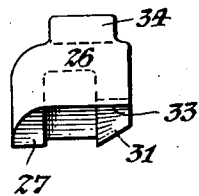
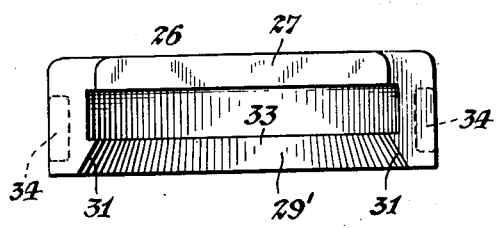
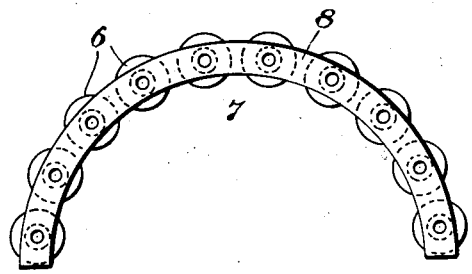
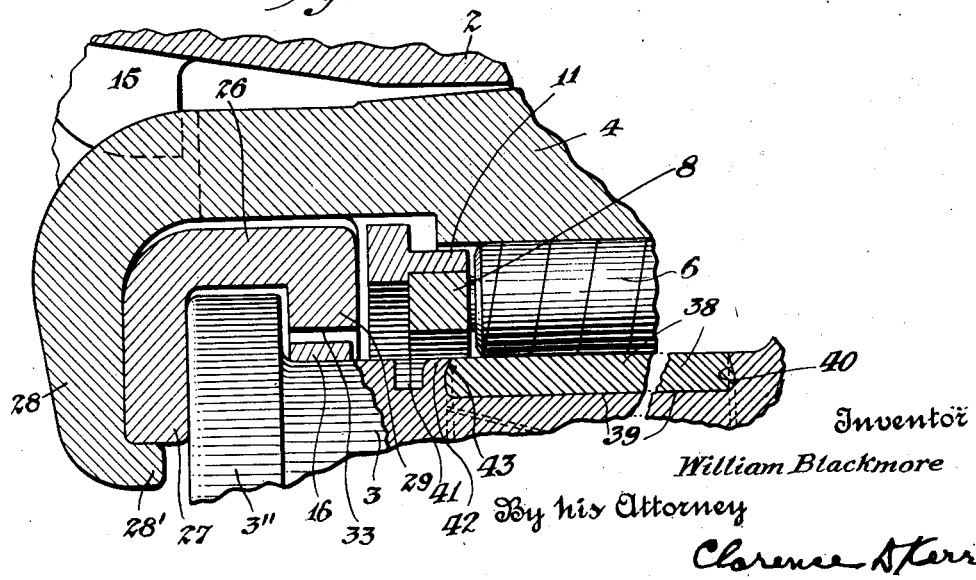

Patented July 17, 1934

1,966,606

UNITED STATES PATENT OFFICE 1,966,606

ROLLER BEARING JOURNAL BOX

William Blackmore, Sharon, Pa., assignor to National Malleable and Steel Castings Company, Cleveland, Ohio, a corporation of Ohio Application February 2, 1929, Serial No. 336,992

22 Claims. (Cl. 308—180)

This invention relates to journal boxes. A prime object of the invention is the provision of a structure particularly applicable to journal boxes and axles of standard American Railway Association construction and adapting such journal boxes and axles for use with roller bearings. One of the features of the invention comprises a journal box bearing member having a surface forming a race for roller bearings and also provided with means for aiding in the lubrication thereof. Another feature resides in the provision of simple and efficient roller bearing retaining means. The invention also comprises a thrust block of novel construction for cooperating with the aforesaid bearing member, as well as the provision of means on the thrust block for assisting in the lubrication of the bearings. Other features of the invention will be hereinafter described and claimed.

In the accompanying drawings, Fig. 1 is a vertical longitudinal section of a journal box assembly embodying my invention, the lid of the box being omitted.

Fig. 3 is a horizontal sectional view, taken on line III—III of Fig. 1, of the right-hand half of the journal box assembly.

Figure 1:
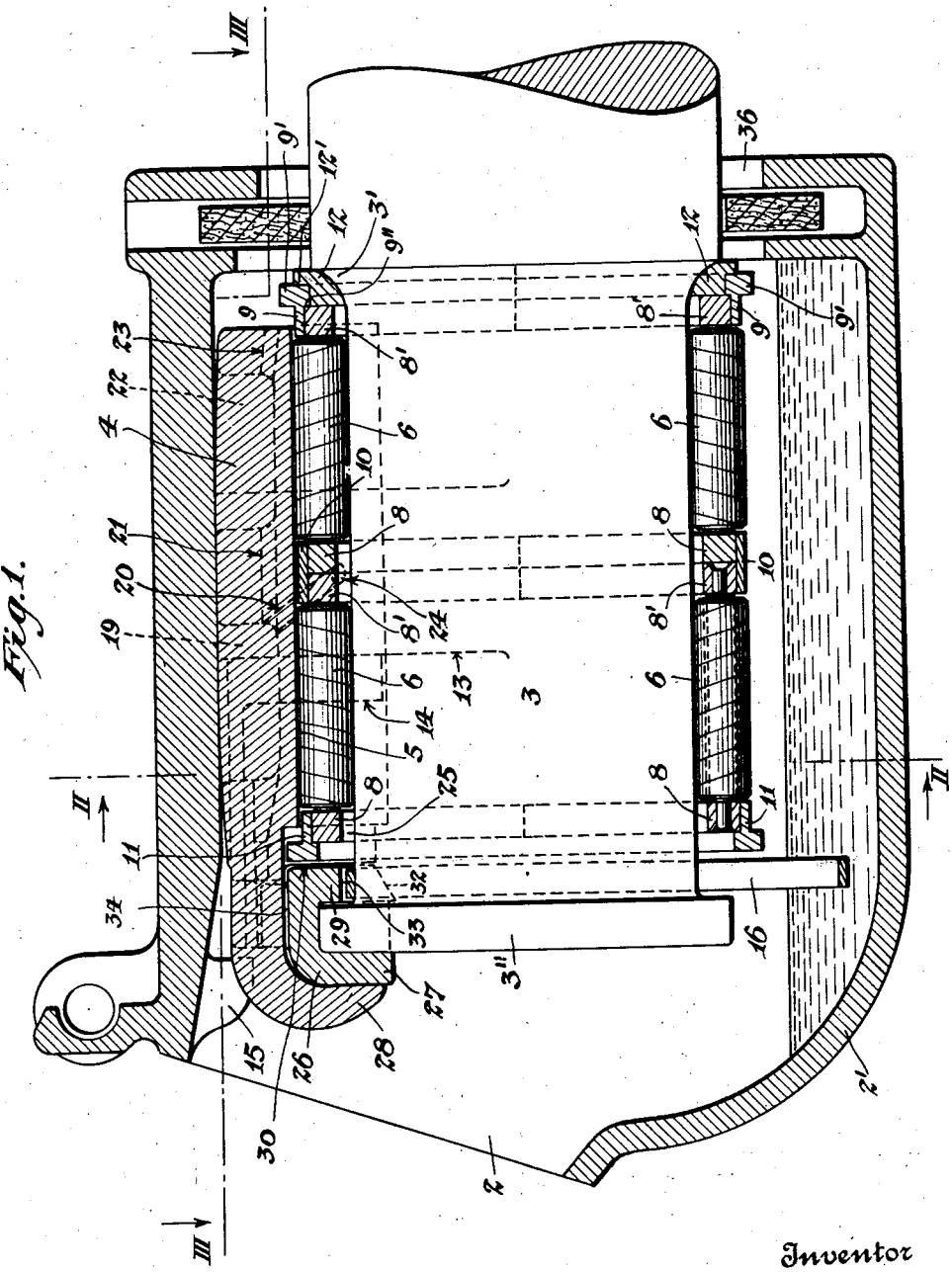

Figs. 4, 5, and 6 are end, bottom plan, and side views respectively, of the journal box bearing member.

Figs. 7, 8, and 9 are end, bottom plan, and side views, respectively, of the thrust block.

Fig. 10 is an end view of one of the roller bearing units.

Fig. 11 is a fragmentary view in vertical longitudinal section showing a modified form of the invention.

Referring to the drawings there is shown at 2 a journal box of standard A. R. A. construction, while a standard A. R. A. journal or axle is shown at 3. Numeral 4 refers to the journal box bearing member, which is provided with a bottom surface 5 (Fig. 5) forming a race for roller bearings 6. The member 4 is shown crowned and may be termed the journal box crown bearing member. The roller bearings 6 are interposed between said bearing member 4 and the journal or axle 3. Four roller bearing units of the type shown at 7 in Fig. 10 may be employed; each unit comprising a pair of semicircular cage members carrying a series of rollers 6. In Fig. 10, the cage member shown is designated 8 while in Fig. 1 the outer and inner cage members of each unit are designated 8, 8', respectively. For retaining the roller bearing units on the axle 3 I provide three rings designated 9, 10, and 11 respectively. The inner retaining ring 9 holds in place the inner cage members 8' of the two inside roller bearing units and is also provided with an annular shouldered portion 9', which surrounds and retains in place the two halves of a bearing ring 12. The latter may be of bronze or other suitable material and bears against shouldered portion 3' of the axle. Portion 9' of ring 9 engages a shoulder 12" on said bearing ring 12, while a shoulder 9" of said ring is engaged by the inner cage members 8' of the inside roller bearing units. The central retaining ring 10 engages and holds in place the outer cage members 8 of the inner roller bearing units and the inner cage members 8' of the outer bearing units; while ring 11 holds in place the outer cage members 8 of said outer bearing units. It will be noted that the retaining rings 9, 10, and 11 are formed with an inside diameter sufficient to allow them to be passed over the shouldered outer end 3" of the axle. In assembling, the two halves of the bearing ring 12 may first be applied to the shouldered portion 3' of the axle; the retaining ring 9 engaged with the ring 12, as shown; the inner roller bearing units applied to the axle and slid to the right (as viewed in Fig. 1) so that the inner cage members of said units are held by said ring 9; the central retaining ring 10 engaged with the outer cage members of said inner units; the outer roller bearing units applied to the axle and slid into engagement with the ring 10; and the ring 11 then applied to the outer cage members of said outer roller bearing units. The inner and outer retaining rings 9, 11 are identical in form and are readily interchangeable; either ring being applicable to either end of the roller bearing units by being turned around into the appropriate position.

Figure 2:
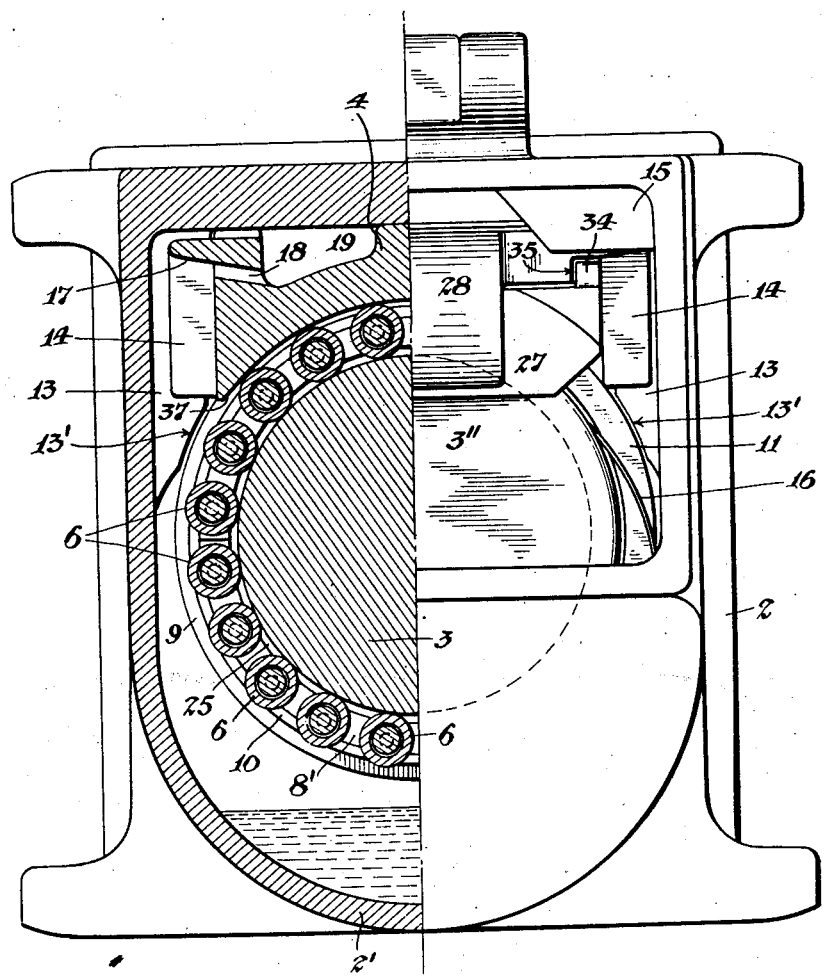
Fig. 2 is a view of the journal box assembly one-half in end elevation, and one-half in transverse vertical section on line II—II of Fig. 1.
Figure 2A:
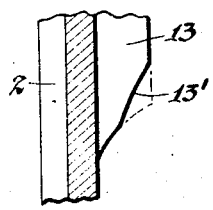
Fig. 2a is a view of a detail.

The journal box 2 is provided with the usual wedge guides 13. However, I prefer to cut away said guides slightly as indicated at 13' to provide adequate clearance for the roller bearings. In Fig. 2a, the dot-dash line indicates the extent of the standard wedge-guide before being cut away. The crown bearing 4 has lateral extensions 14 which have a thrust engagement with the guides 13. Also the journal box is provided with the customary outer wedge retaining lugs 15, and these cooperate with the forward or outer portions 4' of the crown bearing member 4 to provide a thrust bearing. The bottom of the journal box forms a reservoir or basin 2' for lubricating oil. Loosely mounted upon the outer portion of the axle 3 adjacent the shoulder 3″ thereof is an oil ring 16, said oil ring as shown being of greater diameter than the axle 3 and extending downwardly into the lubricating fluid in the bottom of the journal box. As the axle rotates, the oil ring 16 turns also, though at a lower speed, and carries oil upwardly. For cooperating with the oil ring to assist in the distribution of oil I provide on the crown bearing member 4 ledges 17 extending forwardly from the respective lugs 14. Each ledge 17 is provided with an inclined lower surface and cooperates with an adjacent inclined passage 18 which communicates with a recess 19 in the top of the member 4. The ledges 17 serve to collect the oil thrown off by the oil ring 16, the outer roller bearing retaining ring 11, and the shouldered outer end 3″ of the axle as these parts are rotated at high speeds; the oil collected by either ledge flowing through the associated inclined recess 18 and into the adjacent recess 19 in the top of the member 4. From recess 19 the oil flows down through an inclined passage 20 to the inner surface 5 of the crown bearing member. If desired, a passage 21 may be provided to lead some of the lubricant from recess 19 to a recess 22 in the top of the crown bearing member, and a similar passage 23 may be provided for conducting some of the lubricant to the inner end of the bearing member. Oil from the passage 20 is delivered at the point 24 to the roller bearings. The main quantity of the oil which is picked up by the ring 16 is, however, carried along the surface of the axle to the roller bearings and in order to provide a passage for this oil the roller bearing cage members 8 are separated from the axle by a substantial clearance as at 25. Oil may thus flow between the outer set of rollers and furnishes adequate lubrication for the inner rollers as well. It will, of course, be understood that two passages 18 are provided, one for each ledge 17, and that similarly duplicate sets of pockets 19, 22, and communicating passageways 20, 21, 23, may be provided in the top of member 4, each pocket 19 being in direct communication with a corresponding one of the passages 18.

Mounted on the shouldered portion 3″ of the axle 3 is a thrust bearing block 26 provided with an outer depending portion 27 having a thrust engagement with the depending end portion 28 of the crown bearing member 4. It will be seen that thrust loads in one direction are transmitted from the end of the axle 3 to the thrust block 26, from the thrust block to the depending portion 28 of the bearing member 4, and from the latter to the lugs 15 of the journal box. Thrusts in the other direction are transmitted from the inner side of the shoulder 3″ on the end of the axle 3 to the inner lip portion 29 of the thrust block, and thence to the surface 30 of the crown bearing 4 from which surface they are transmitted through the lugs 14 to the journal box lugs 13. The thrust bearing ring 12 at the inner end of the journal box serves only as a bearing between the roller bearings and the axle, and does not transmit the end thrust from the box to the axle.

I have provided means whereby the thrust block 26 may cooperate with the ring 16 to force inwardly toward the rollers 6 the lubricant picked up by said ring. This I accomplish in the following manner:— The inner surface 29′ of the thrust block lip 29 is tapered rearwardly as at 31 at the point 32 where the ring 16 enters between the axle and thrust block. This taper diminishes, however, as the center or top portion of the lip is approached until at 33 the surface 29′ is parallel to the surface of the axle. Thus, the space between the oil ring 16 and surface 29′ is greater where the ring enters with its supply of oil than at the center 33, and the oil is thus squeezed and forced out toward the rollers as the space between ring 16 and surface 29′ diminishes. This, it will be seen, applies to either direction of rotation of the axle and oil ring, the rearward taper of the surface 29′ decreasing from each end thereof to the top or center of the lip 29. The thrust block 26 may be provided with upstanding lugs 34 for engagement in corresponding recesses 35 in the crown bearing member 4.

The crown bearing 4 and thrust block 26 may be readily removed from the journal box as follows:—The box is first jacked up to the extent that the clearance at 36 (see Fig. 1) between the journal box and the axle is taken up. The crown bearing and thrust block are then raised by lifting the thrust block until its lip 29 clears the shoulder 3″ of the axle. The thrust block and crown bearing can now be pulled forward until the thrust block is free of the axle, whereupon said thrust block is dropped out of engagement with the crown bearing. After the thrust block has thus been removed, the crown bearing may reading be tilted and completely withdrawn.

The roller race portion 5 of the crown bearing member 4 may be beveled off slightly at the point where the rollers first come into engagement therewith, as at 37 (Fig. 2); the surface 37 being at a tangent to the inner surface of the crown bearing. In this way, it is insured that the rollers are properly guided into engagement with the crown bearing without damage to either the crown bearing or the rollers. Similarly, the opposite side portion of said race 5 may be beveled, so that the guiding of the rollers into engagement with member 4 may be facilitated for rotation of axle 3 in either direction.

In Fig. 11 I have shown a modification wherein the upstanding lugs 34 of the thrust block are omitted and the depending portion 28 of the crown bearing has been extended laterally at 28′ underneath the end of the thrust block to carry the same. For disassembling the crown bearing and thrust block in this modified structure, the procedure is similar to that outlined in connection with the thrust block and crown bearing of Fig. 1, the journal box being first jacked up as above described and the crown bearing and thrust block being then raised and drawn forwardly until the thrust block has cleared the end of the axle. The crown bearing and thrust block can then readily be tilted and drawn further forwardly and the thrust block moved laterally with respect to the crown bearing to free said block from the lip 28′, after which the crown bearing may be completely removed.

In the modified structure of Fig. 11 I have also shown a hardened steel insert or split sleeve 38 applied to that portion of the axle surface which forms the inner race for the rollers 6. The split sleeve 38 seats in a groove 39 machined or otherwise formed in the axle 3. The groove 39 may be undercut at its inner end, as at 40, for the purpose of securing the inner end of the split sleeve 38 in place in the axle. Adjacent the outer end of the groove 39 in the axle a second groove 41 is provided. The metal of the axle at 42 which separates the grooves 39 and 41 is peened or rolled over against the beveled outer end 43 of the split sleeve 38 thereby serving to hold the sleeve in place in the groove 39 in the axle. After the sleeve 38 has been thus secured to the axle it may, if desired, be subjected to a finish grinding operation to insure a true and accurate inner race of correct diameter for the roller bearing units.

The use of hardened inserts such as the split sleeve 38 is obviously particularly desirable when my invention is applied to existing equipment wherein the bearing portion of the axle may be somewhat worn. In this case the application of the hardened sleeve provides a means of restoring the axle bearing or journal to the correct diameter to suit it to a standard size of roller bearing unit, and thus insure an even bearing on all the rollers so that each will carry its fair share of the load.

When hardened sleeves are not employed, as in the arrangement of Fig. 1, the surface of the axle journal 3 may be case-hardened to give longer life to the roller bearing surface.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

I claim:

1. In a journal box, an element forming a bearing for said box and also forming a race for roller bearings, a pair of outer and a pair of inner roller bearing units mounted for independent insertion in the box and interposed between the journal and said element, each unit consisting of a series of roller bearings mounted in semi-circular cage members, and retaining means for holding said cage members together comprising a retaining ring for the inner cage members of the inner units, a retaining ring cooperating both with the outer cage members of the inner units and the inner cage members of the outer units, and a retaining ring for the outer cage members of the outer units.

2. In a journal box, an element forming a bearing for said box, and also forming a race for roller bearings, roller bearing units including roller assembly rings interposed between the journal and said element, a bearing ring positioned between the roller bearing units and a shouldered portion of the journal and being in snug engagement with said shouldered portion, and a separable retaining ring encircling both the bearing ring and the inner end of the roller bearing units.

3. In combination, a journal having a shouldered end and a shouldered inner portion, roller bearing units mounted on said journal, a divided bearing ring interposed between and adapted to engage said shouldered portion and the inner end of said units, and a separable retaining ring encircling both said bearing ring and said units, for maintaining the bearing ring adjacent the journal.

4. In combination, a journal having a shouldered inner portion, roller bearing units each consisting of semi-circular cage members having roller bearings mounted therein, said units being mounted on said journal, a bearing member consisting of semi-circular portions interposed between said units and the shouldered portion of the journal, said bearing member having a shoulder, and a retaining ring cooperating with the shoulder on said bearing member and having a shoulder cooperating with the inner cage members of the roller bearing units to hold these parts together.

5. In combination, a journal having a shouldered inner portion, inner and outer roller bearing units formed in sections and mounted on said journal, a bearing member interposed between said units and said shouldered inner portion, said bearing member having a shoulder thereon, a retaining ring cooperating with the shoulder on said bearing member, and having a shoulder cooperating with the inner end of the inner roller bearing units to hold the parts together, and a retaining ring having a shoulder and cooperating with the outer end of the outer roller bearing units.

6. In a journal box, a bearing member adapted to be interposed between the box and the axle and having an inner surface forming a race for roller bearings, an oil ring carried by said axle, and means forming a cavity of decreasing area towards the top of the journal and between the oil ring and said bearing member for forcibly distributing oil.

7. In a journal box, a bearing member adapted to be positioned between the box and an axle, lugs on said member adapted for thrust engagement with projections on said box, and longitudinally extending oil deflecting ledges on said member forming pockets with said lugs.

8. In a journal box, a housing, a bearing member adapted to be interposed between the top of the housing and an axle, said member having a depending outer end portion for taking up end thrusts between the axle and journal box, a thrust block interposed between said axle and said bearing member, and means whereby said thrust block and said bearing member cooperate in the distribution of oil.

9. In a journal box, a bearing member adapted to be interposed between said box and an axle, a thrust block interposed between the axle and said member, an oil ring carried by said axle, and means on said thrust block cooperating with said oil ring for forcing oil from said ring to the surface of said axle.

10. In a journal box, a bearing member adapted to be interposed between said box and an axle, and having an inner surface forming a race for roller bearings, roller bearings interposed between said member and said axle, a thrust block interposed between said axle and said member for receiving end thrust from the axle, an oil ring carried by said axle, and means whereby said member and said thrust block cooperate with said oil ring for forcibly distributing oil to said bearings.

11. In a journal box, a thrust block, oil conveying means adjacent said thrust block, and means on said thrust block cooperating with said oil conveying means for distributing under pressure oil conveyed by said oil conveying means.

12. In a journal box, a thrust block, shiftable means adjacent said thrust block for conveying oil, said thrust block having a lip with a progressively decreasing bevel cooperating with said oil conveying means for distributing oil conveyed thereby.

13. In a journal box, a thrust block having an annular lip portion, and an oil ring cooperating with said annular lip portion, said lip portion having a bevel which decreases progressively from an outer end thereof to the center whereby oil conveyed by said ring is forced away from said ring.

14. In a journal box, a thrust block having a central annular portion for receiving a shoulder on the axle, a depending outer portion and a depending inner lip portion, said lip portion having its lower edge formed with a progressively varying bevel.

15. In a journal box, a bearing member having a thrust engagement with said box and provided with a depending outer end portion, a thrust block having a depending outer portion opposed between said depending end portion of the bearing member and a shoulder on the axle, said thrust block also having an annular lip portion whose edge has a progressively decreasing bevel, and an oil ring cooperating with said annular lip portion.

16. In a journal box, a bearing member having a thrust engagement with said box and provided with a depending outer end portion, a thrust block having a depending outer portion opposed between said depending end portion of the bearing member, and a shoulder on the axle, said thrust block also having an annular portion having a surface with a progressively decreasing bevel, roller bearings interposed between said axle and said bearing member and means operable by the axle co-operating with said bevelled surface to feed oil to said bearings.

17. In a journal box, a journal, an element forming a bearing for said box and also forming a race for roller bearings and extending around a part only of said journal, a plurality of sets of rollers cooperating with said race, a pair of semi-circular cage members carrying each set of said rollers, and roller bearing retaining rings interposed between the journal and said element and serving to hold said cage members in proper relation to said journal.

18. In a journal box, a housing, a journal within the housing, a bearing member between the journal and housing, a roller bearing unit between the journal and bearing member, a thrust block interposed between the bearing member and the end of the journal, an oil ring carried on the journal, said bearing member, thrust block, roller bearing unit and oil ring enclosing a cavity of varying cross-sectional area whereby oil is forced around the roller bearings.

19. In combination a journal box housing, a journal and a bearing member within the housing, a roller bearing unit between the journal and the bearing member, a thrust block between the bearing member and the end of the journal, an oil ring for carrying oil to the top of the journal, said bearing member, oil ring, thrust block and roller bearing unit forming an oil receiving cavity, one of said members having a tapered portion causing oil to be forced from said cavity to the roller bearing unit.

20. In a journal box, a bearing member adapted to be interposed between said box and an axle, said member having a thrust receiving portion associated therewith, an oil conveying member carried by said axle, and means carried by said bearing member adjacent said portion and cooperating with said oil conveying member to form a confined and restricted passage for forcing oil from said oil conveying member to the surface of said axle.

21. In a journal box, a bearing member interposed between said box and an axle, said member having thrust receiving means associated therewith, an oil conveying member mounted directly on said journal, said means forming certain of the walls of a confined passageway for receiving said oil conveying member, said passageway being restricted at the top of the journal for forcing oil from said oil conveying member to the surface of said axle.

22. In a journal box, an oil reservoir formed at the bottom of the box, a bearing member adapted to be interposed between said box and an axle, an oil conveying member carried by said axle and depending into said reservoir, and means associated with said bearing member partly in the plane of said conveying member and forming therewith a confined passage restricted adjacent the top of the conveying member for forcing oil therefrom to the surface of the axle.

WILLIAM BLACKMORE.